J. F. Bogardus,
Wrist-Pin Turner,

No. 57,620.      Patented Aug. 28, 1866.

Witnesses:
Geo. S. Walker
Chas. H. Smith

Inventor:
John F. Bogardus.

UNITED STATES PATENT OFFICE.

JOHN F. BOGARDUS, OF BROOKLYN, NEW YORK, ASSIGNOR TO HIMSELF, JOS. ANDERSON, AND T. K. SCHERMERHORN, OF SAME PLACE.

IMPROVED APPARATUS FOR TURNING SHAFTS.

Specification forming part of Letters Patent No. 57,620, dated August 28, 1866.

*To all whom it may concern:*

Be it known that I, JOHN F. BOGARDUS, of Brooklyn, in the county of Kings and State of New York, have invented and made a certain new and useful Improvement in Machinery for Turning Shafts, Crank-Pins, &c.; and I do hereby declare the following to be a full, clear, and exact description of the said invention, reference being had to the annexed drawings, making part of this specification, wherein—

Figure 2:
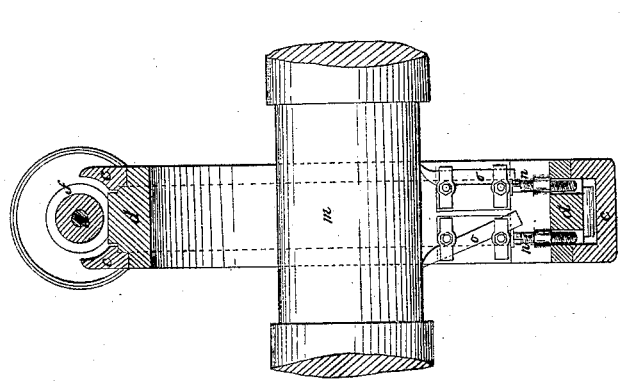
Figure 4:
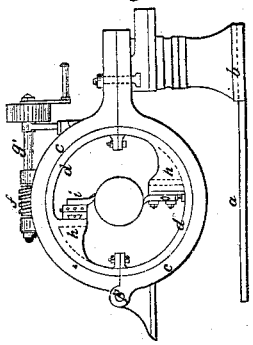
Figure 1:
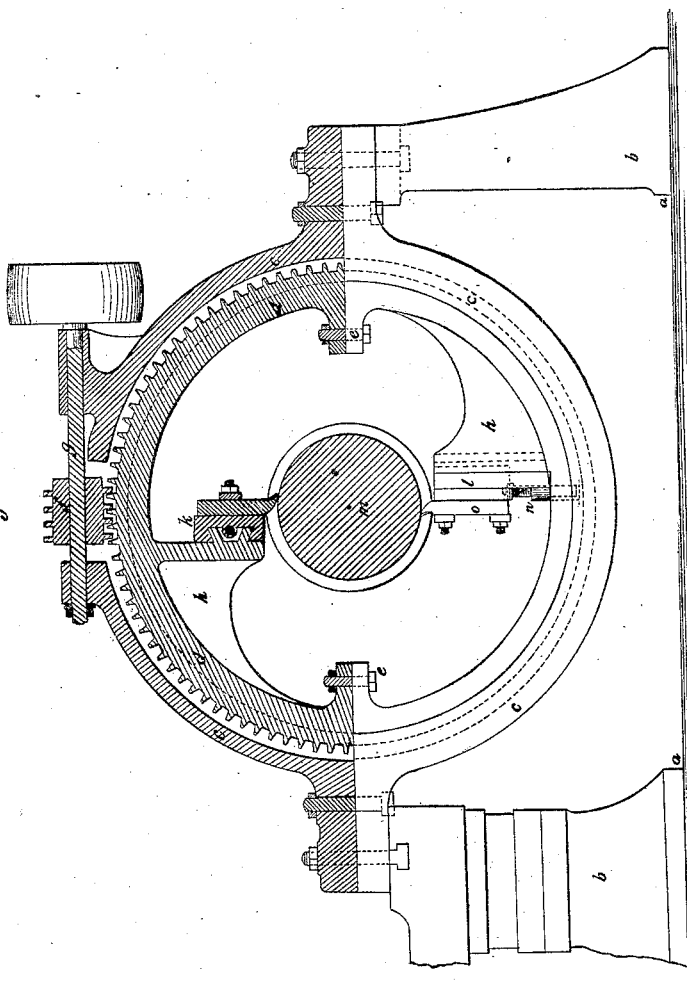
Figure 3:
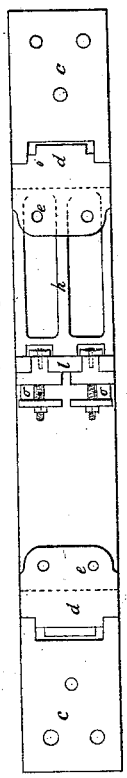

Figure 1 is an elevation and partial section of my improvement. Fig. 2 is a transverse section of the ring and circular rest in place for acting upon a shaft. Fig. 3 is a plan of the lower half of the ring and circular rest; and Fig. 4 is an elevation, in smaller size, of a modification of the circular rest.

Shafting has heretofore been turned by a revolving chuck carrying tools and acting upon a shaft passing through the center of such chuck; but in this case no provision was made for turning shoulders or collars upon such shafts, nor for turning crank-pins upon the cranks of shafts without removing the shaft from the centers upon which it was mounted.

The nature of my said invention consists in a revolving ring carrying the cutting or turning tools, in combination with an inclosing circular rest that can be opened and placed around a shaft or a crank-pin, and then employed for carrying the turning-tool around the shaft, so as to turn the same with the greatest accuracy, either plain or with collars or shoulders; and said machine may be mounted upon the slide-rest of a lathe, so as to turn a shaft complete, and then be moved to turn the crank-pin with its axis perfectly parallel to that of the shaft; or my said apparatus may be attached to any shaft, crank, or other piece of machinery and employed in turning the same off truly without the necessity of removing the part to a turning-lathe, thus giving facility for truing or completing portions of machinery that may have been repaired or may not have been accurately constructed.

In the drawings, *a a* represent the bed of a lathe. *b* is a portion of the slide-rest, operated in any usual manner. *c* is a circular rest, made in two pieces, and bolted together and to the parts of the slide-rest *b* or other place of attachment.

*d* is a ring-shaped tool-holder, fitting accurately within the circular rest *c*. This is made in two parts and bolted together at *e*.

*f* is a worm-pinion, mounted on a shaft, *g*, in bearings in *c*, and driven by competent power. This pinion acts upon teeth around the edge of the ring *d* within the rest *c*, so as to revolve the tool-ring *d* with regularity. This pinion *f* and parts might be duplicated, so as to revolve the tool-ring by power applied to opposite sides.

Upon the inside of the tool-ring *d* are flanges *h*, carrying slide-rests *k l*. The rest *k* acts parallel with the shaft *m* to be turned, so as to bring the turning-tool *i* to either side of the ring *d*, and the rests *l* are adjustable radially of the ring *d* by means of screws *n*, so as to bring the tool or tools *o* nearer to or farther from the axis of the shaft *m*.

By this mode of construction the turning-tools are as much under control as in an ordinary lathe, and the rotation of the tool-ring within its circular rest causes the turning to be performed with great accuracy and celerity.

The whole apparatus can be fed along by the ordinary screw of the lathe; and when desired to turn a crank-pin it can be effected by simply opening the tool-ring and rest, moving the slide-rest to the place, and setting the parts together around the crank-pin, and the shaft itself does not require to be moved from its centers; hence the turning must be accurately performed.

In Fig. 4 the same apparatus is shown on a smaller scale; but the rest *c* is united at one side by a hinge, *p*, instead of by bolts.

The tool-ring may be revolved by hand, and the apparatus used with a lathe or separate therefrom.

What I claim, and desire to secure by Letters Patent, is—

1. The rings *c* and *d*, divided and otherwise constructed and fitted together, as described, in combination with worm-wheel *f* or other equivalent means for imparting a movement of rotation to said ring *d*.

2. The arrangement of the rests *k* and *l* and tools *i* and *o* with a rotating ring, substantially as described.

In witness whereof I have hereunto set my signature this 2d day of April, 1866.

JOHN F. BOGARDUS.

Witnesses:
GEO. D. WALKER,
CHAS. H. SMITH.